UNITED STATES PATENT OFFICE.

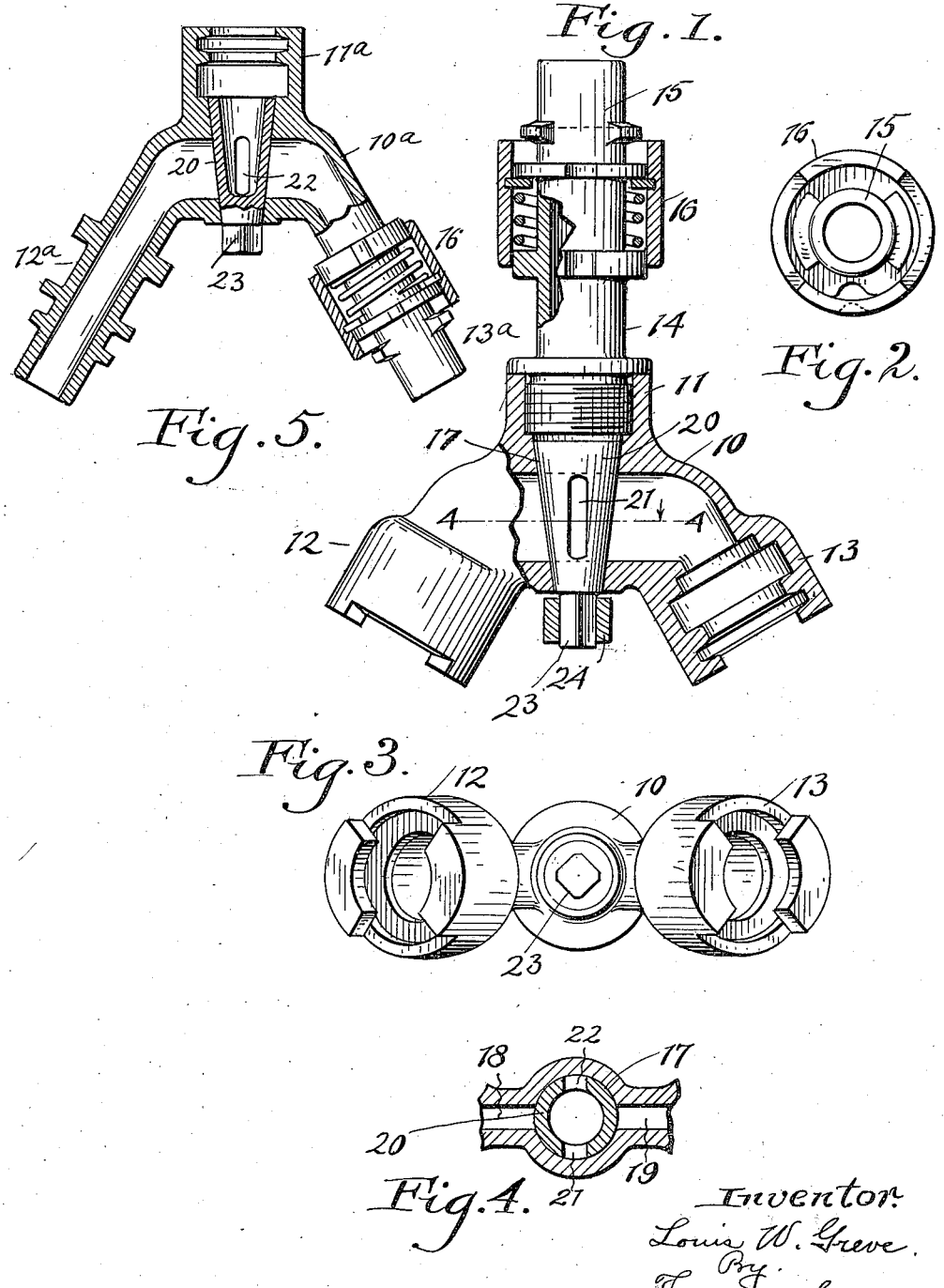

LOUIS W. GREVE, OF CLEVELAND, OHIO, ASSIGNOR TO THE CLEVELAND PNEUMATIC TOOL COMPANY, OF CLEVELAND, OHIO, A CORPORATION OF OHIO.

FITTING FOR AIR LINES AND THE LIKE.

1,425,642. Specification of Letters Patent. Patented Aug. 15, 1922.

Application filed August 1, 1918. Serial No. 247,708.

*To all whom it may concern:*

Be it known that I, LOUIS W. GREVE, a citizen of the United States, residing at Cleveland, in the county of Cuyahoga and State of Ohio, have invented a certain new and useful Improvement in Fittings for Air Lines and the like, of which the following is a full, clear, and exact description.

This invention relates to a fitting for air lines and the like, and has for its object to provide a fitting, preferably in the form of a Y, by which connection may be made from a main supply line to two or a plurality of branch or delivery lines, together with a valve at the axis of the fitting adapted to control the supply of fluid to all branch pipes, and so constructed that it will be firmly seated by the pressure of the air or other fluid being transmitted, and will not become loose and permit leakage. A further object is to provide a fitting having the characteristics above mentioned, and which is neat in appearance, serviceable, and not of excessive weight.

The invention may be briefly summarized as consisting in certain novel details of construction and combination and arrangement of parts as will be described in the specification and set forth in the appended claim.

In the accompanying sheet of drawings, Fig. 1 is a side view of a fitting involving my invention, parts being in section; Fig. 2 is a top plan view of the same; Fig. 3 is a bottom view of the same; Fig. 4 is a section substantially along the line 4—4 of Fig. 3 looking in the direction indicated by the arrows; and Fig. 5 is a view similar to Fig. 1 on a reduced scale, showing a slight modification.

The fitting embodying my invention includes a body 10, in this instance in the form of a Y having an inlet end 11, with two branches having outlet ends 12 and 13. The inlet end 11 is designed to be connected to a main supply pipe or to a main air line, assuming that the fitting is for air lines for which the device was designed and is particularly adapted, and the outlet ends 12 and 13 will be connected to branch pipes or hose extending to tools such as pneumatic riveters or chippers, or other tools or devices to which air is to be supplied under pressure.

In the construction shown in Fig. 1, the inlet end 11 is in the form of an internally threaded flange or boss which receives a nipple 14 on the end of which is formed a male coupling member 15 with a spring actuated locking sleeve 16 of what is commonly known as a Bowes coupling, substantially as shown in the U. S. Patent to Bowes, No. 699,366, and the outlet or delivery ends 12 and 13 are formed as the female members of the same type of coupling.

Other forms of couplings or ways of connecting the ends of the fitting to supply and delivery pipes may be made, but I prefer that the ends be provided or formed with quick detachable coupling members such as of the Bowes type herein illustrated. It might be mentioned at this point that it is not essential that the coupling member provided at the inlet end of the fitting be connected thereto by a separate or separable nipple 14, as the coupling member may be formed as an integral part of the Y fitting; and while I prefer that a coupling member of one type be at the inlet end, and of the reverse type be at the outlet ends, such as the male coupling member at the inlet end, and the female coupling members at the outlet ends, the arrangement may be reversed by providing a female coupling member at the inlet end, and male coupling members at the ends of the outlet branches, as shown in Fig. 5, wherein the body of the fitting here designated 10ª is provided with an inlet end 11ª, formed with a female coupling member, and the ends of the branches 12ª and 13ª are formed with male coupling members.

At the axis of the Y fitting, directly in line with the inlet end, there is formed a tapered valve seat 17 with its large end toward the inlet end of the fitting, the chamber in which this seat is formed having two ports or passageways 18 and 19 extending laterally outward through the branches toward the outlet ends 12 and 13, these passageways being in this case diametrically opposite each other.

Seated on this tapered valve seat is a tapered or conical valve 20 which is hollow, and has extending through its tapered wall, two diametrically opposite ports 21 and 22. The ports 18 and 19 in the branches are rather narrow or elongated where they extend from the wall forming the tapered valve seat, and the ports 21 and 22 of the tapered shell forming the valve are likewise narrow and elongated, and are preferably of the same dimensions as the ports in the valve seat, so that when the valve is closed there will be sufficient engaging wall between the ports of the valve and the ports of the valve seat to minimize possibility of leakage.

The small end 23 of the tapered valve member 20 is extended through the fitting between the ends of the branches, and it is squared or otherwise shaped to receive a lever, wrench, or other member 24 by which the valve may be turned from off position to on position, and vice versa, there being sufficient space between the ends of the branches to permit the valve to be turned or rotated from one position to the other.

In Figs. 1 and 4 the valve is fully closed, the ports in the valve being on a line at right angles to the ports 18 and 19, or midway between the two so that the valve at the same time shuts off the supply of air from both branch pipes designed to be connected to the outlet ends of the fitting, but when the valve is turned 90° from the position shown in these figures, air or other fluid will be supplied from the inlet pipe which will be connected to the inlet end of the fitting, to both branch pipes.

It will be observed that the pressure of the air or motive fluid is on the large end of the valve, and tends at all times to seat the valve so that as wear occurs, the valve will seat as firmly as when originally put into use, and as a result there is little possibility of leakage taking place since the pressure of the air or fluid holds the co-acting or contacting faces of the valve and valve seat in engagement, and the greater the pressure of the fluid transmitted, the more tightly the parts fit together.

In conclusion it might be mentioned that a combination of the Y fitting with a valve controlling the passage of fluid from the inlet to the outlet ends is accomplished without requiring a fitting any larger or bulkier than would be required if the valve were not present, so that the features of compactness as well as durability are realized to a very decided degree.

While I have shown two preferred forms or ways of carrying out the invention, I do not wish to be confined to the precise details of construction or arrangement shown, but aim in my claims to cover all modifications which do not involve a departure from the spirit and scope of my invention in its broadest aspects.

Having described my invention, I claim:

A fitting for air lines and the like substantially in the form of a Y provided with a central part with an inlet portion and a tapered valve seat having its end toward the inlet portion, said fitting being provided also with a pair of outlet portions having outlet passageways which are elongated adjacent the central part of the fitting and terminate in elongated ports in the valve seat, and a tapered valve engaging said seat and having elongated ports adapted to register with said elongated ports of the seat.

In testimony whereof, I hereunto affix my signature.

LOUIS W. GREVE.